(12) United States Patent
Kato et al.

(10) Patent No.: US 8,189,512 B2
(45) Date of Patent: May 29, 2012

(54) PROXY MOBILE IP ROUTING

(75) Inventors: Ryoji Kato, Kanagawa (JP); Shinta Sugimoto, Kanagawa (JP); Toshikane Oda, Tokyo (JP)

(73) Assignee: Telefonaktibolaget L M Ericsson (Publ), Stockholm (SE)

( * ) Notice: Subject to any disclaimer, the term of this patent is extended or adjusted under 35 U.S.C. 154(b) by 146 days.

(21) Appl. No.: 12/532,808

(22) PCT Filed: Mar. 23, 2007

(86) PCT No.: PCT/EP2007/052829
§ 371 (c)(1),
(2), (4) Date: Mar. 26, 2010

(87) PCT Pub. No.: WO2008/116494
PCT Pub. Date: Oct. 2, 2008

(65) Prior Publication Data
US 2010/0226256 A1    Sep. 9, 2010

(51) Int. Cl.
*H04W 4/00* (2009.01)
*H04L 12/28* (2006.01)
(52) U.S. Cl. ......... 370/328; 370/331; 370/338; 370/389
(58) Field of Classification Search .................. 370/328, 370/331
See application file for complete search history.

(56) References Cited

U.S. PATENT DOCUMENTS

| | | | |
|---|---|---|---|
| 2002/0039367 A1* | 4/2002 | Seppala et al. | 370/401 |
| 2006/0018291 A1* | 1/2006 | Patel et al. | 370/335 |
| 2007/0189219 A1* | 8/2007 | Navali et al. | 370/331 |
| 2007/0230410 A1* | 10/2007 | Thubert et al. | 370/338 |
| 2007/0254661 A1* | 11/2007 | Chowdhury et al. | 455/436 |
| 2008/0225807 A1* | 9/2008 | Patil | 370/338 |

* cited by examiner

*Primary Examiner* — Brandon Renner
(74) *Attorney, Agent, or Firm* — Roger S. Burleigh

(57) ABSTRACT

A method and apparatus for routing communications traffic in a Proxy Mobile IP communications network. A Mobile Node is attached to a first Proxy Mobile Agent, and an optimized route is established between the Mobile Node and a Corresponding Node via the first Proxy Mobile Agent. When the Mobile Node subsequently attaches to a second Proxy Mobile Agent, a determination is made that the Mobile Node is no longer attached to the first Proxy Mobile Agent. As a result of the determination a request is sent from the first Proxy Mobile Agent to the Corresponding Node to cancel the route optimization. In one embodiment, packets from the Corresponding Node are bi-cast from the Proxy Mobile Agent to the Home Agent and the Mobile Node. The Proxy Mobile Agent determines that the Mobile Node is no longer attached to if packets are not returned from the Home Agent.

8 Claims, 11 Drawing Sheets

PROXY MOBILE IP ROUTING

TECHNICAL FIELD

The invention relates to the field of Mobile IP, and in particular to routing traffic in a Proxy Mobile IP network.

BACKGROUND

Mobile IP (MIP), which is described in IETF RFC 3344, allows users of mobile communications devices to move from one network to another whilst maintaining a permanent IP address, regardless of which network they are in. This allows the user to maintain connections whilst on the move. For example, if a user were participating in a Voice Over IP (VoIP) session and, during the session the user moved from one network to another, without MIP support the user's IP address may change This would lead to problems with the VoIP session.

A Mobile Node (MN) is allocated two IP addresses: a permanent home address and a care-of address (CoA). The CoA is associated with a node in the network that the user is currently visiting. To communicate with the MN, packets are sent to the MN home address. These packets are intercepted by a Home Agent in the home network, which has knowledge of the current CoA. The Home Agent then tunnels the packets to the CoA of the MN with a new IP header, whilst preserving the original IP header. When the packets are received by the MN, it removes the new IP header and obtains the original IP header. The MN sends packets directly to another node via a foreign agent in the visited network. The foreign agent maintains information about visiting MNs, including the CoA of each visiting MN.

Proxy Mobile IP v6 (PMIPv6), IETF draft-sgundave-mip6-proxymip6-01, describes a Proxy Mobile Agent (PMA) function. This function emulates home link properties in order to make a MN behave as though it is on its home network and allows support for mobility on networks that would not otherwise support MIPv6.

A PMA is usually implemented at the access router. The PMA sends and receives mobility related signalling on behalf of a MN. When a MN connects to an access router having a PMA, the MN presents its identity in the form of a Network Access Identifier (NM) as part of an access authentication procedure. Once the MN has been authenticated, the PMA obtains the user's profile from a policy store. The PMA, having knowledge of the user profile and the NAI, can now emulate the MN's home network. The MN subsequently obtains its home address from the PMA. The PMA also informs the MN's Home Agent of the current location of the MN using a Binding Update message. The Binding Update message uses the NAI of the MN. Upon receipt of the Binding Update message, the Home Agent sets up a tunnel to the PMA and sends a binding acknowledgement to the PMA. On receipt of the Binding Acknowledgement, the PMA sets up a tunnel to the Home Agent. All traffic from the MN is routed to the Home Agent via the tunnel.

The Home Agent receives any packet that is sent to the MN, and forwards the received packet to the PMA through the tunnel. On receipt of the packet, the PMA removes the tunnel header and sends the packet to the MN. The PMA acts as a default router on the access link. Any packets sent from the MN are sent via the PMA to the Home Agent, which then sends the packet on to its ultimate destination.

Mobility Support in IPv6 (IETF RFC 3775 June 2004) describes route optimization initiated by the MN for messages sent from and to the MN. However, the Proxy MIPv6 specification, which is a variant of MIPv6, doesn't assume any mobility management protocol in the MN. The techniques for route optimization specified in MIPv6 cannot be applied to PMIPv6 without modification.

As PMIPv6 does not assume mobility management protocol in the MN, the PMA processes the signals defined in MIPv6 on behalf of the MN. The PMA is therefore well placed to process route optimization signalling on behalf of the MN, although to date there has been no suggestion or description of how the PMA should perform route optimization. A trivial solution would be to apply the principles of route optimization specified in MIPv6. As illustrated in FIG. 1, using this solution, the PMA (PMA1 in this case) sends a route optimization request (e.g., MIPv6 Binding Update) to a Corresponding Node (CN, a node with which the MN is communicating) containing the IPv6 address of PMA1 as the Care-of Address.

As illustrated in FIG. 2, a problem arises with this solution when a user with a MN moves from one access network to another access network, and therefore no longer connects to the network via the old PMA (PMA1), but connects via a new PMA (PMA2). The route optimization was performed whilst the MN was connecting via PMA1. In MIPv6, the MN is aware of the handover and can request a new route optimization. However, where the MN is connected via a PMA the PMA emulates the MN's HA, and so the MN is unaware of the handover and so does not request a new route optimization after handover to PMA2. Downlink packets from the CN to the MN have a source address of CN and destination address of MN, and so are sent to PMA1. The MN is therefore unreachable by the CN.

Using MIPv6, the MN is aware of the handover, and can initiate a new route optimization. Using PMIPv6, if the PMA is not aware of the handover of the MN, then the PMA cannot initiate a new route optimization. Provided the MN moves within the PMIPv6 domain, the MN's IP address remains unchanged, and so even if the MN is a MIPv6 client, the MN will not send a signal for a new request of route optimization or for cancellation of the current route optimization to the CN.

Another problem with handover of the MN from PMA1 to PMA2 is packet loss. Packet loss during a handover is a problem for all mobile protocols, and sending packets over an optimized route increases the risk of packet loss because the anchor point (the HA) does not have control of the optimized route taken by packets.

SUMMARY

According to a first aspect of the invention, there is provided a method of routing communications traffic in a Proxy Mobile IP communications network, in which a Mobile Node is attached to a first Proxy Mobile Agent, and an optimized route is established between the Mobile Node and a Corresponding Node via the first Proxy Mobile Agent, and the Mobile Node subsequently detaches from the first Proxy Mobile Agent and attaches to a second Proxy Mobile Agent, the method comprising:

at the first Proxy Mobile Agent, determining when the Mobile Node is no longer attached to the first Proxy Mobile Agent;

as a result of the determination, sending a request from the first Proxy Mobile Agent to the Corresponding Node to cancel the route optimization.

It is preferred that the step of determining when the Mobile Node is no longer attached to the first Proxy Mobile Agent comprises determining that a Binding Cache entry for the Mobile Node at the Mobile Node's Home Agent has changed.

One way of determining when the Mobile Node is no longer attached to the first Proxy Mobile Agent comprises:

receiving at the first Proxy Mobile Agent packets sent from the Corresponding Node;

forwarding the packets to the Mobile Node and to a Home Agent of the Mobile Node;

if the packets are returned to the first Proxy Mobile Agent from the Home Agent, determining that the Mobile Node is attached to the first Proxy Mobile Agent, and if the packets are not returned to the first Proxy Mobile Agent from the Home Agent, determining that the Mobile Node is no longer attached to the first Proxy Mobile Agent.

The forwarding of packets to both the Mobile Node and the Home Agent is termed 'bi-casting'. An advantage of this method is that the packets sent to the Home Agent are addressed to the Mobile Node, and so the Home Agent will automatically return then to the Proxy Mobile Agent. This is the normal behaviour of the Home Agent, and so no modification of the Home Agent or the Mobile Node is required.

The method may comprise, prior to establishing the optimized route between the Mobile Node and the Corresponding Node:

establishing that the Mobile Node and the Corresponding Node belong to the same Proxy Mobile IP Domain;

sending a request for route optimization from the first Proxy Mobile Agent to the Corresponding Node via the second Proxy Mobile Agent;

on receiving at the first Proxy Mobile Agent an acknowledgement of the request, creating a Binding Cache entry at the first Proxy Mobile Agent, the Binding Cache entry including the source address of the second Proxy Mobile Agent.

An alternative method for determining when the Mobile Node is no longer attached to the first Proxy Mobile Agent comprises receiving at the Proxy Mobile Agent a signal informing from the Home Agent informing the first Proxy Mobile Agent that the Mobile Node is no longer attached to the first Proxy Mobile Agent. The sending of this signal from the Home Agent may be triggered by a change in the Binding Cache entry for the Mobile Node in the Home Agent. An advantage of this method over the 'bi-casting' method is that traffic on the network is reduced.

Another way of determining when the Mobile Node is no longer attached to the first Proxy Mobile Agent is when an indication is received at the Proxy Mobile Agent from link-layer protocols that the Mobile Node is unreachable from the first Proxy Mobile Agent. Again, this reduces the amount of traffic on the network compared to the 'bi-casting' method.

The method may further comprise, prior to determining when the Mobile Node is no longer attached to the first Proxy Mobile Agent, forwarding packets destined for the Mobile node to the Mobile Node, a Home Agent, and at least one neighbouring Proxy Mobile Agent. This ensures that packets are sent to the likely Proxy Mobile Agents that the Mobile Node may subsequently attach to.

Preferably, the Mobile Node connects to the first Proxy Mobile Agent via a mobility-aware access network. This allows the first Proxy Mobile Agent to become aware when the Mobile Node subsequently attaches to a second Proxy Mobile Agent.

Once it has been determined that the Mobile Node is no longer attached to the first Proxy Mobile Agent, it is preferable to cancel the forwarding of packets from the first Proxy Mobile Agent to the Home Agent.

The request to cancel the route optimization may be a request to delete at the Corresponding Node a Binding Cache entry for the Mobile Node. Once the Binding Cache Entry has been deleted, the Corresponding Node will revert to its default behaviour and send all packets to the Mobile Node's Home Agent.

According to a second aspect of the invention, there is provided a Proxy Mobile Agent comprising:

means to determine when a Mobile Node is no longer attached to the Proxy Mobile Agent;

a transmitter for, as a result of the determination, sending a request to a Corresponding Node to cancel a route optimization.

The Proxy Mobile Agent may further comprise:

a receiver for receiving packets sent from the Corresponding Node;

a transmitter for sending the packets to the Mobile Node and to a Home Agent of the Mobile Node; and means for determining that the Mobile Node is attached to the first Proxy Mobile Agent if the sent packets are returned from the Home Agent, and for determining that the Mobile Node is no longer attached to the first Proxy Mobile Agent if the sent packets are not returned from the Home Agent.

By 'bi-casting' the packets to both the Mobile Node and the Home Agent, the invention takes advantage of the behaviour of the Home Agent, which returns to the Proxy Mobile Agent all packets addressed to the Mobile Node. Using this embodiment, no modification is required to the Home Agent in order for the Proxy Mobile Agent to become aware that the Mobile Node is no longer attached to it.

The Proxy Mobile Agent preferably comprises:

means for determining that the Mobile Node and the Corresponding Node belong to the same Proxy Mobile IP Domain;

a transmitter for sending a request for route optimization from the Proxy Mobile Agent to the Corresponding Node via a further Proxy Mobile Agent;

a receiver for receiving an acknowledgement of the request; and, means for creating a Binding Cache entry, the Binding Cache entry including the source address of the further Proxy Mobile Agent.

According to a second aspect of the invention, there is provided a Home Agent for use in a Proxy Mobile IP communications network, the Home Agent comprising:

means for determining that a Mobile Node has performed a handover from a first Proxy Mobile Agent to a second Proxy Mobile Agent; and a transmitter for sending a signal to the first Proxy Mobile Agent, the signal informing the first Proxy Mobile Agent that the Mobile Node is no longer attached to the first Proxy Mobile Agent.

DETAILED DESCRIPTION

Figure 1:
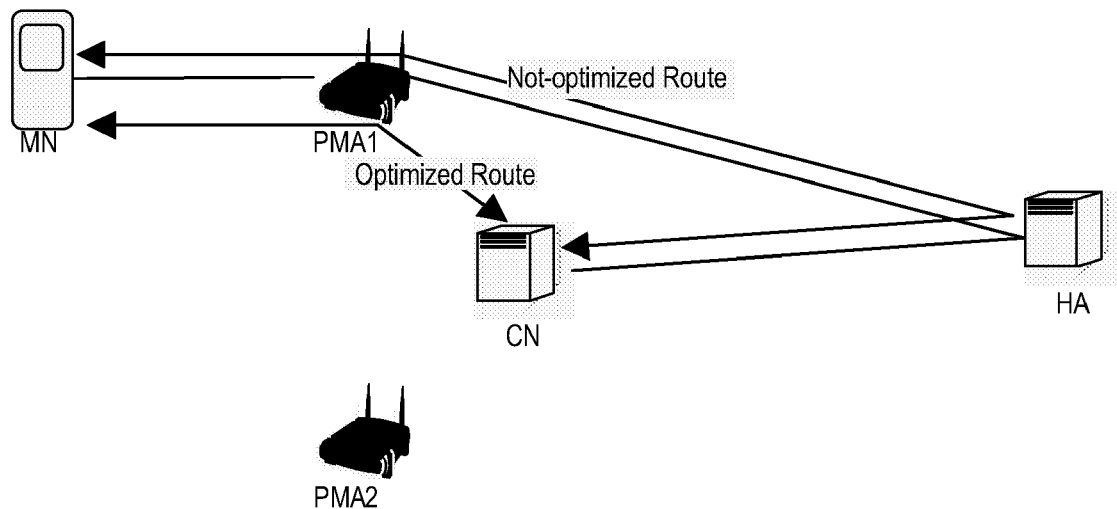
FIG. 1 illustrates schematically route optimization using a Proxy Mobile Agent.
Figure 2:
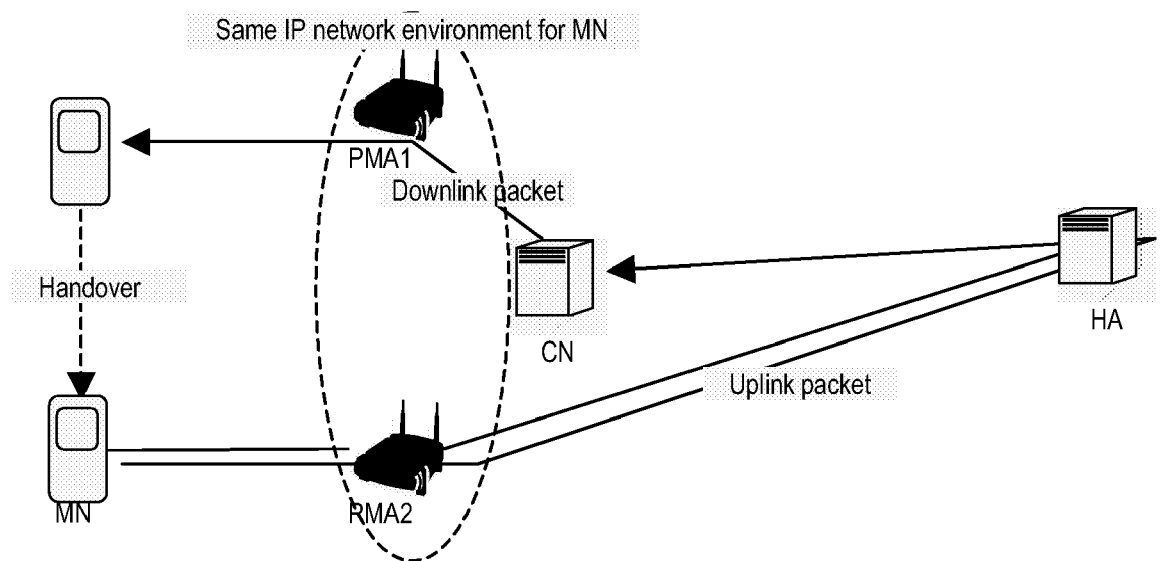
FIG. 2 illustrates schematically routing after handover of a Mobile Node from an old Proxy Mobile Agent to a new Proxy Mobile Agent.
Figure 3:
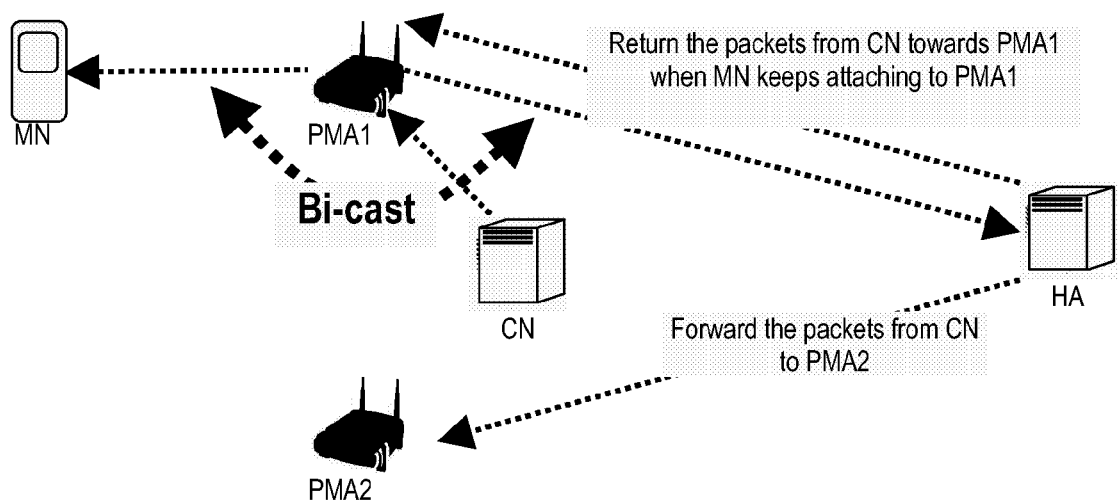
FIG. 3 illustrates schematically the signalling for detection of handover at a Proxy Mobile Agent.

Proxy Mobile Agent PMA1, as shown in FIG. 3, is involved in route optimization between the MN and the CN. Route optimization is performed in which downlink packets from the Corresponding Node (CN) are sent to the Mobile Node (MN) via PMA1, rather than via the Home Agent (HA). The downlink packets received at PMA1 are then sent both to the MN and the HA (this is termed bi-casting). As shown in FIG. 3, the downlink packets sent to the HA from the PMA1 are returned to the PMA1. This is because the packets are addressed to the MN, and the HA is aware that these packets should traverse the PMA to which the MN is attached (in this case PMA1). After handover, when the MN moves and attaches to PMA2, the downlink packets sent to the HA are forwarded to PMA2, as the HA is aware that the MN is connected via PMA2.

PMA1 detects that the downlink packets are not returned from the HA, and so becomes aware that MN is no longer attached to PMA1. This indicates that the MN is now attached to another PMA. This detection is a trigger for the PMA1 to perform handover related procedures such as cancellation of the route optimization with the CN that has previously been performed. PMA1 does not detect a lack of packets from the MN in an uplink to detect that the MN is no longer attached to PMA1, because in the case where unidirectional traffic is being sent from the CN to the MN via PMA1, there would be no uplink packets to detect. Furthermore, even where communication between the CN and the MN is bi-direction, a handover of the MN to PMA2 during transmission of packets from the CN to the MN would not be detected until PMA1 next expects uplink packets from the MN.

A further advantage of bi-casting is that the risk of packet loss during handover from PMA1 to PMA 2 is reduced, because the downlink packets sent to PMA1 are sent to the HA and forwarded to PMA2 immediately after the HA performs a change of the binding cache entry for the MN when the MN attaches to PMA2.

Figure 4:
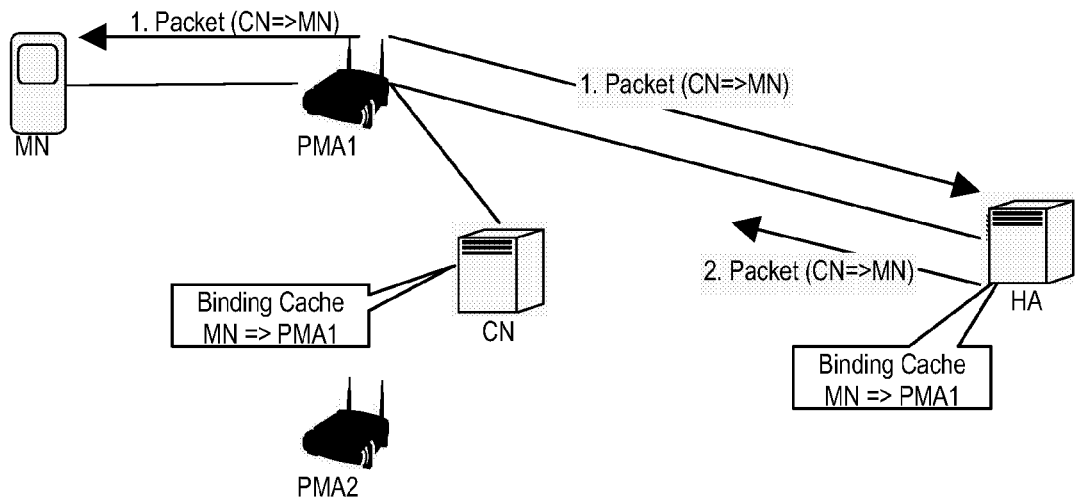
FIG. 4 illustrates schematically bi-casting of downlink packets from the Proxy Mobile Agent to the Mobile Node and the Home Agent.
Figure 5:
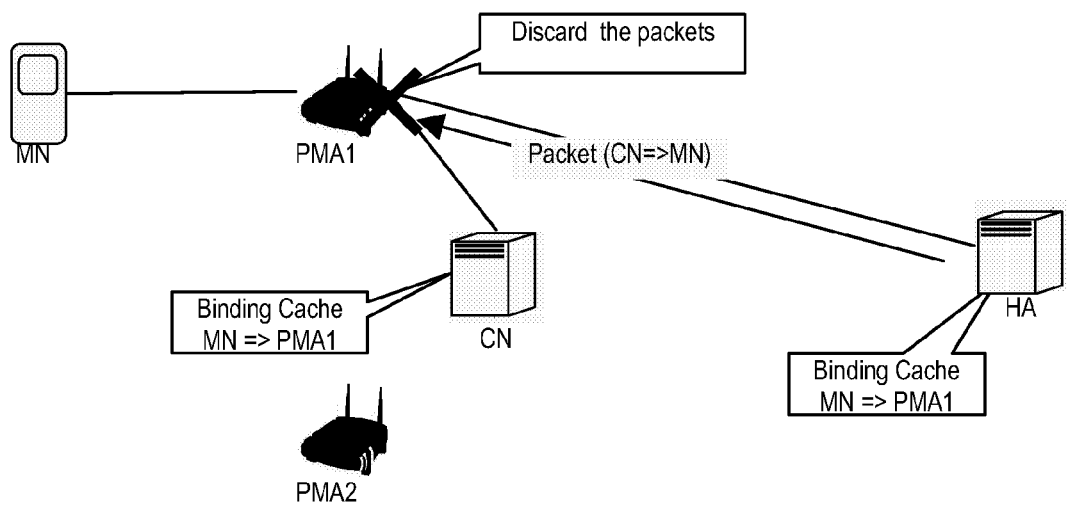
FIG. 5 illustrates schematically the discarding of packets returned to the Proxy Mobile Agent from the Home Agent.

Referring now to FIG. 4, the bi-casting procedure is shown in more detail. PMA1 performs a route optimization such that downlink packets sent from the CN to PMA1. The headers of the downlink packets contain a source address of CN and a destination address of MN. When these packets are received at PMA1 they are bi-cast to the MN and the HA, as shown in step 1. As shown in step 2, the HA returns the packets to PMA1 because the destination in each packet header is MN. When the packets are returned to PMA1 they are discarded, as shown in FIG. 5. The reason that the packets are discarded is that they have already been sent from PMA1 to the MN.

Figure 6:
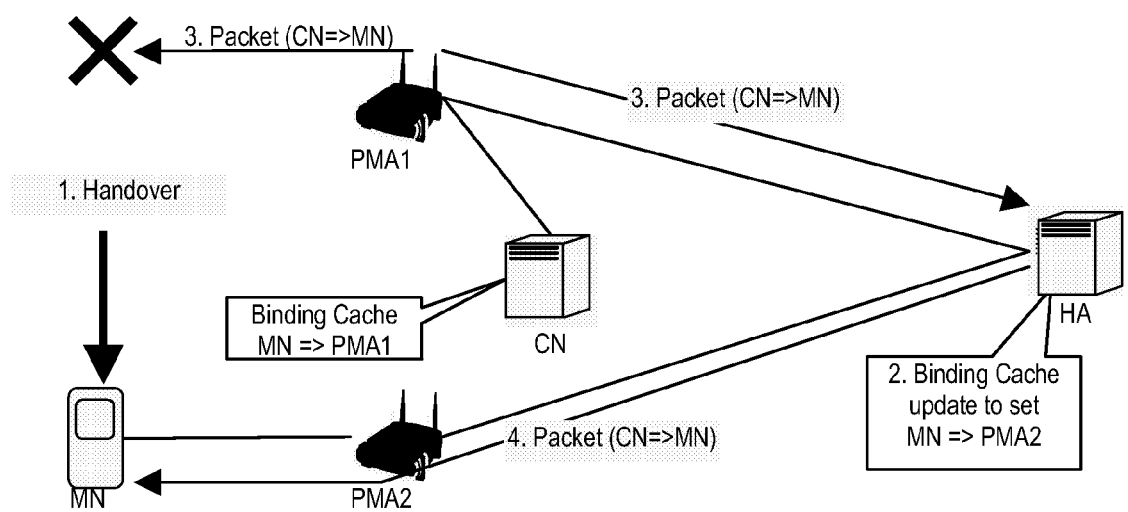
FIG. 6 illustrates schematically a hand-over from an old Proxy Mobile Agent to a new Proxy Mobile Agent.

When the MN moves to a new access network, it performs a handover from PMA1 to PMA2, as illustrated in FIG. 6. As a result of the handover, the HA changes the MN's Care-of-Address (CoA) from PMA1 to PMA2. Any downlink packets sent from the CN to PMA1 are bicast to the MN (which is no longer attached to PMA1, and so not received from PMA1) and the HA. The HA sends the packets addressed to the MN to PMA2, as PMA2 has the new CoA of the MN. The packets are then sent from PMA2 to the MN The packets sent from PMA1 to the HA are not returned to PMA1 from the HA, and so PMA1 becomes aware that the MN is no longer attached to PMA1. This is a trigger for PMA1 to initiate cancellation of the route optimization, as illustrated in FIG. 7.

Figure 7:
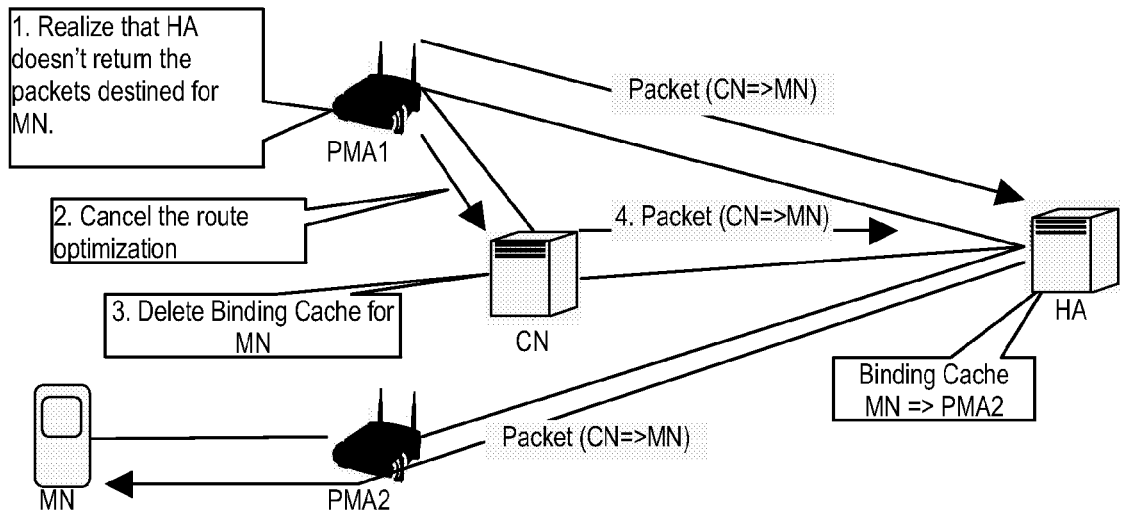
FIG. 7 illustrates schematically the cancellation of route optimization from the old Proxy Mobile Agent after a handover of a Mobile Node to a new Proxy Mobile Agent.

The procedure to cancel the route optimization that the PMA1 performs after the handover of the MN from PMA1 to PMA2 is illustrated schematically in FIG. 7. After handover, the HA starts to forward the bi-cast packets destined for the MN to the PMA2. PMA1 realizes that the MN is not longer attached to PMA1 because the HA does not return the bi-cast packets destined for the MN. As shown in step 2 of FIG. 7, PMA1 sends a request to the CN to cancel the route optimization for the MN. The CN deletes the Binding Cache that sends downlink packets directly to PMA1, and reverts to forwarding the downlink packets to the HA.

Figure 8:
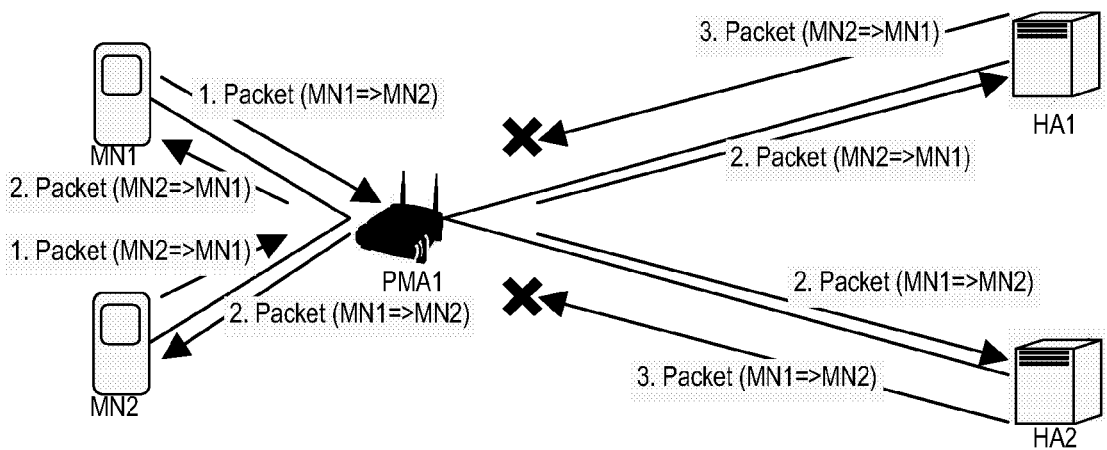
FIG. 8 illustrates schematically route optimization between two Mobile Nodes attached to the same Proxy Mobile Agent.

FIG. 8 illustrates a special case of route optimization where two Mobile Nodes attached to the same PMA commnicate with one another. The two Mobile Nodes, MN1 and MN2 are both attached to PMA1. HA1 is the Home Agent for MN1, and HA2 is the Home Agent for MN2. PMA1 performs route optimization such that MN1 and MN2 can communicate with each other directly without traversing HA1 or HA2.

PMA1 bi-casts packets received from MN1 (source=MN1, destination=MN2) to both MN2 and HA2, and, as described above, PMA1 discards packets returned from HA2 because the same packets have been already sent to MN2. Similarly, PMA1 bi-casts packets received from MN2 (source=MN2, destination=MN1) to both MN1 and HA1. As before, the packets returned from the HA1 are discarded by the PMA1 because same packets have been already sent to MN1.

Figure 9:
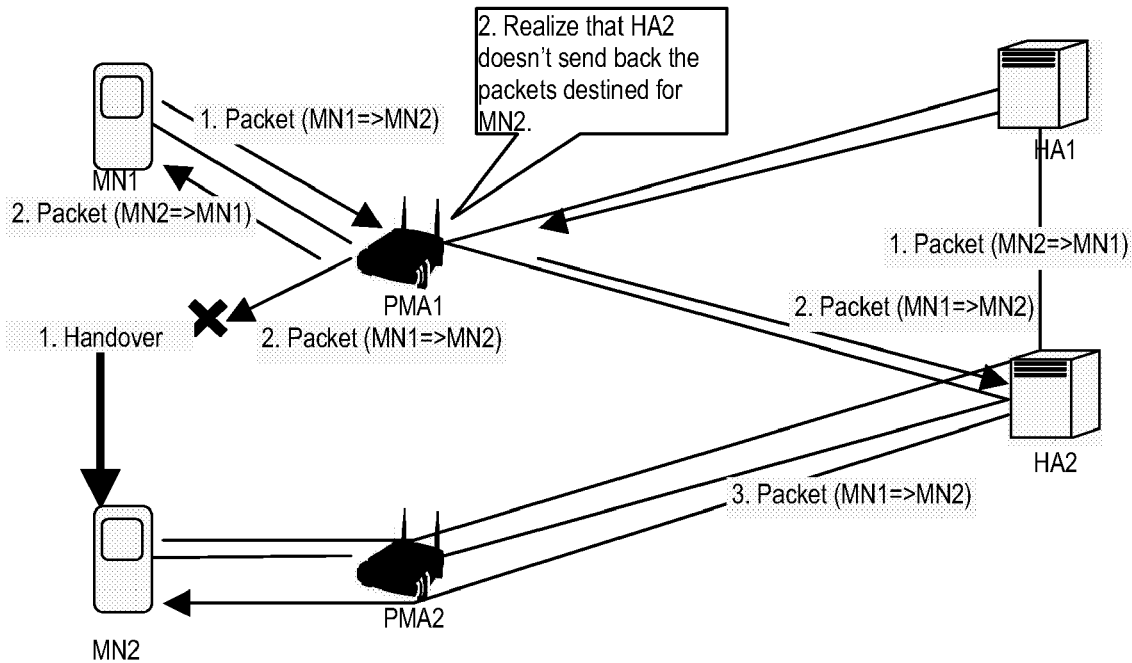
FIG. 9 illustrates schematically the signalling when one of the Mobile Nodes of FIG. 8 moves from the old Proxy Mobile Agent to a new Proxy Mobile Agent.

When MN2 moves to another access network, it attaches to PMA2 and is no longer attached to PMA1. This scenario is illustrated in FIG. 9. After handover, packets sent from MN2 to MN1 are sent first to HA2, then to HA1, and then to PMA1.

Figure 10:
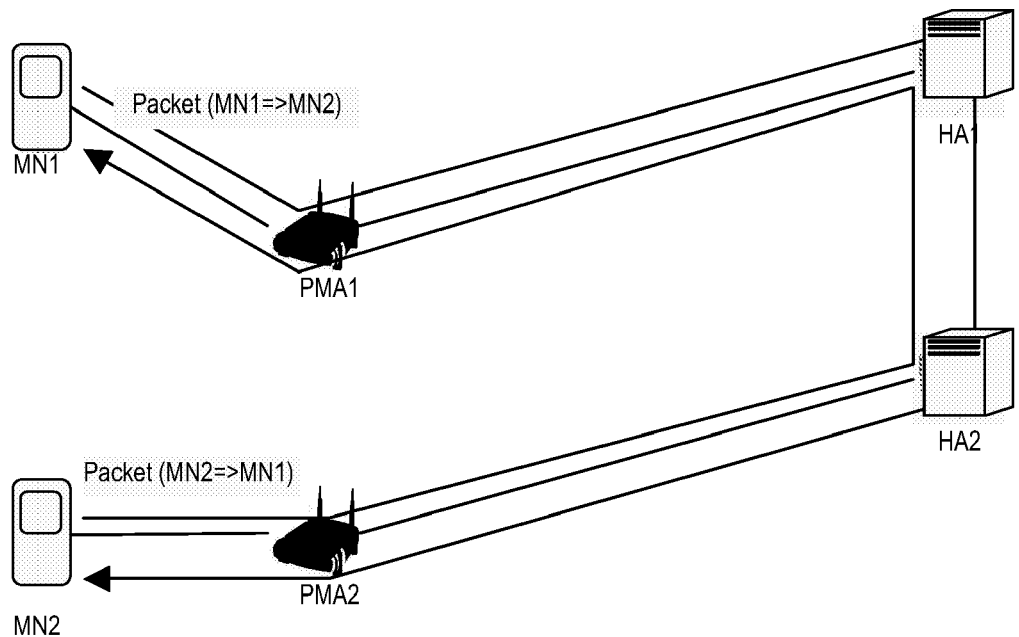
FIG. 10 illustrates schematically the signalling after successful handover illustrated in FIG. 9.

PMA1 forwards these packets to MN1. Packets sent from MN1 to MN2 are sent to HA2 via PMA1. However, as MN2 is now attached to PMA2, the packets sent from PMA1 to HA2 are not returned to PMA1, but are sent to PMA2. PMA1 therefore becomes aware that MN2 is no longer attached to PMA1, and so PMA1 sends the packets via a non-optimaized route as illustrated in FIG. 10, in which packets sent from MN1 to MN2 traverse PMA1, HA1, HA2 and PMA2 before being forwarded to MN2, and packets sent from MN2 to MN1 traverse PMA2, HA2, HA1 and PMA1 before being forwarded to MN1.

Figure 11:
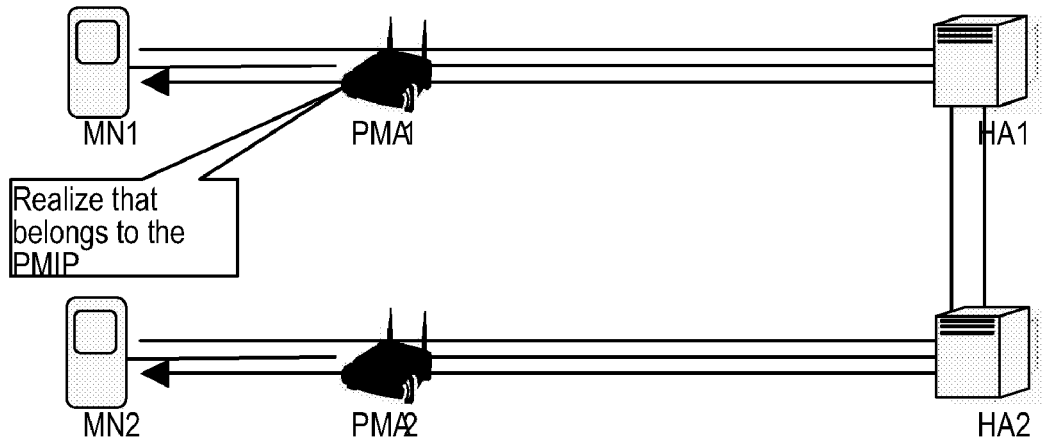
FIG. 11 illustrates schematically the signalling between two Mobile Nodes that belong to the same Proxy MIP domain.
Figure 12:
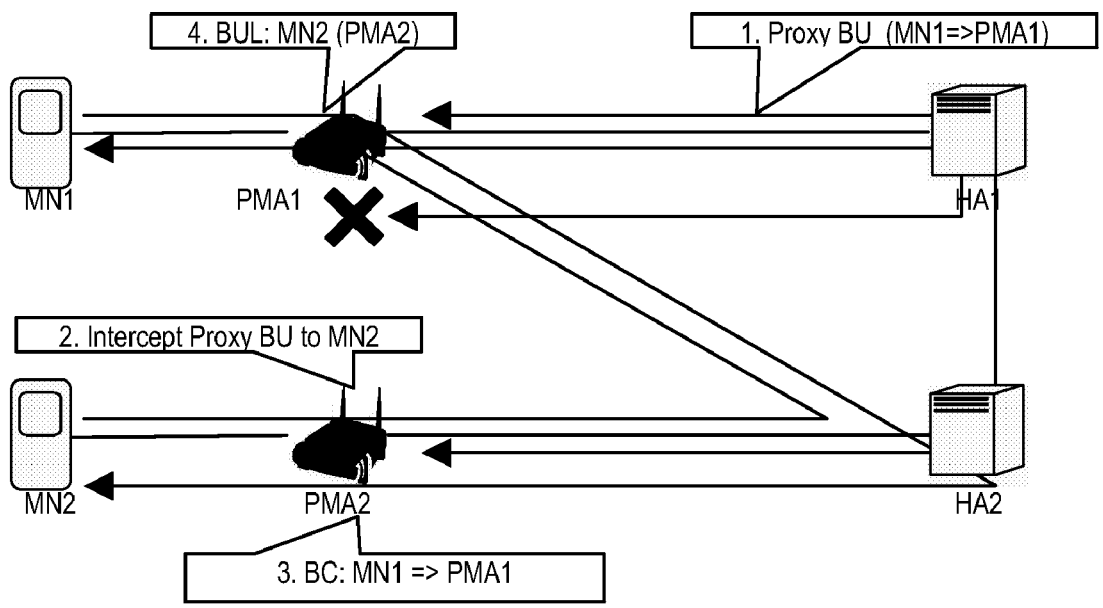
FIG. 12 illustrates schematically a request for route optimization where both Mobile Nodes belong to the same Proxy MIP domain.

The case where two Mobile Nodes belong to the same Proxy MIP domain is known as domain-local communication, and is illustrated in FIG. 11. When MN1 communicates with MN2, PMA1 becomes aware that MN1 and MN2 belong to the same Proxy MIP domain, as both Mobile Nodes belong to the same Proxy MIP domain, and PMA1 is aware of the address ranges that will be assigned to each Mobile Node. This awareness triggers PMA1 to send a request for route optimization, as illustrated in FIG. 12.

The request for route optimization is in a different format to that of a normal Mobile IPv6 Binding Update to ensure that the request is intercepted and understood by PMA2. The format can that of a Proxy Binding Update or any suitable equivalent. The request is addressed to MN2. Because the request is sent in a special format, it is intercepted by PMA2. If the request is a normal MIPv6 Binding Update, it is forwarded from PMA2 to MN2.

PMA2 responds to the request with an acknowledgement. When PMA1 receives the acknowledgement, it adds MN2 to the Binding Update list, and unlike a normal entry in a Binding Update list, the MN2 entry includes the source address of PMA2, as PMA2 is the target to which PMA1 sends the request of deleting the Binding Cache. The Binding Cache is therefore created on PMA2 and not MN2.

Figure 13:
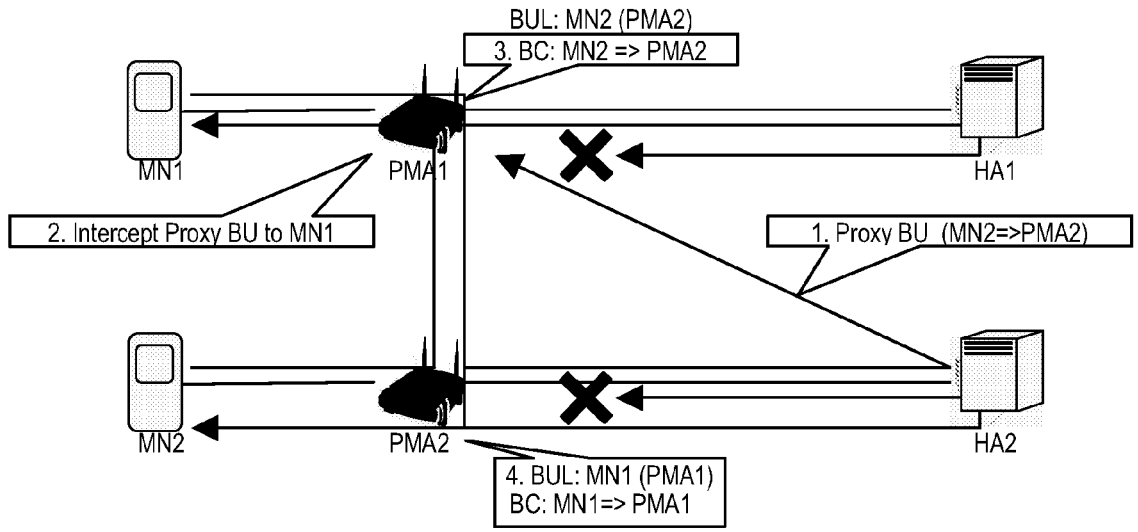
FIG. 13 illustrates schematically a further request for route optimization where both Mobile Nodes belong to the same Proxy MIP domain.

In a similar manner to that described above, PMA2 sends a request of route optimization to the MN1, as illustrated in FIG. 13.

Figure 14:
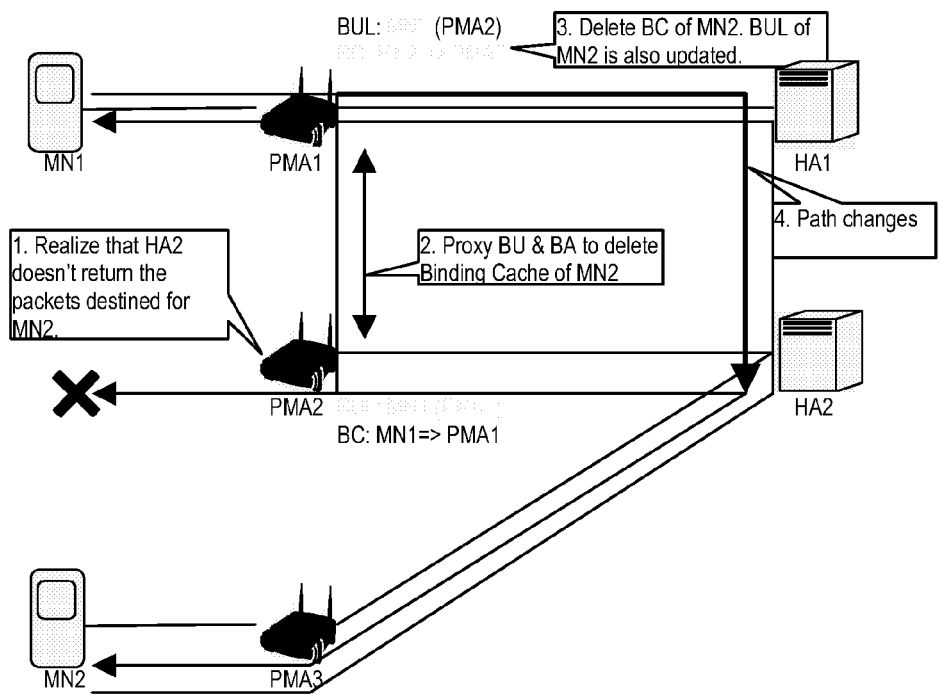
FIG. 14 illustrates schematically the signalling after handover of one of the Mobile Nodes of FIGS. 12 and 13 to a third Proxy Mobile Agent.

MN2 may subsequently handover from PMA2 to a new Proxy Mobile Agent, PMA3. This situation after handover is illustrated in FIG. 14. As described above, PMA2 becomes aware that MN2 has performed the handover from PMA2 because it realises that packets destined for MN2 and bi-cast to HA2 are not returned by HA2, as they are forwarded to PMA3. PMA2 therefore sends a request to PMA1 to delete the entry of MN2 from the Binding Cache. PMA1 deletes the entry from the Binding Cache, and also clears MN2 from the Binding Update List. PMA1 forwards packets destined for MN2 to HA1 because the Binding Cache has been deleted. These packets are sent on to HA2, and then to PMA3, before being forwarded to MN2.

This embodiment requires no support from other nodes (MN, HA, CN, and other PMAs), and there is no requirement for Layer 2 functionalities. No modifications are required to Home Agents, Mobile Nodes or to the current Proxy MIPv6 specification. The invention provides low packet loss during a handover between PMAs. In some embodiments, no signalling is necessary to the previous Proxy Mobile Agent. Mobile Nodes start to receive packets from the previous Proxy Mobile Agent immediately after the handover is complete.

There are alternative ways to bi-casting by which a Proxy Mobile Agent can become aware that a Mobile Node has moved to another Proxy Mobile Agent. For example, a PMIPv6 HA knows the identity of the previous PMA to which the MN was attached before moving to the current PMA. The HA may send a signal to the previous PMA infomring it that the MN is now attached to a new PMA. This reduces the amount of traffic, as bi-casting is not required.

Figure 15:
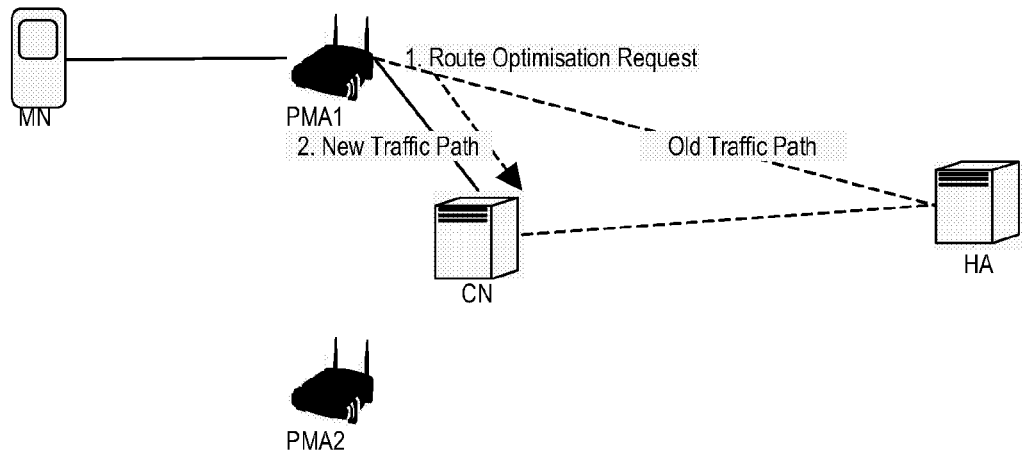
FIG. 15 illustrates schematically the signalling for route optimization prior to handover in an alternative embodiment.

FIG. 15 illustrates route optimization prior to the handover from PMA1 to PMA2. PMA1 sends a request of route optimization to HA, which requests the CN to forward packets destined for MN to PMA1. The request may be in the form of a Mobile IPv6 Binding Update, or may use any other suitable protocol.

Figure 16:
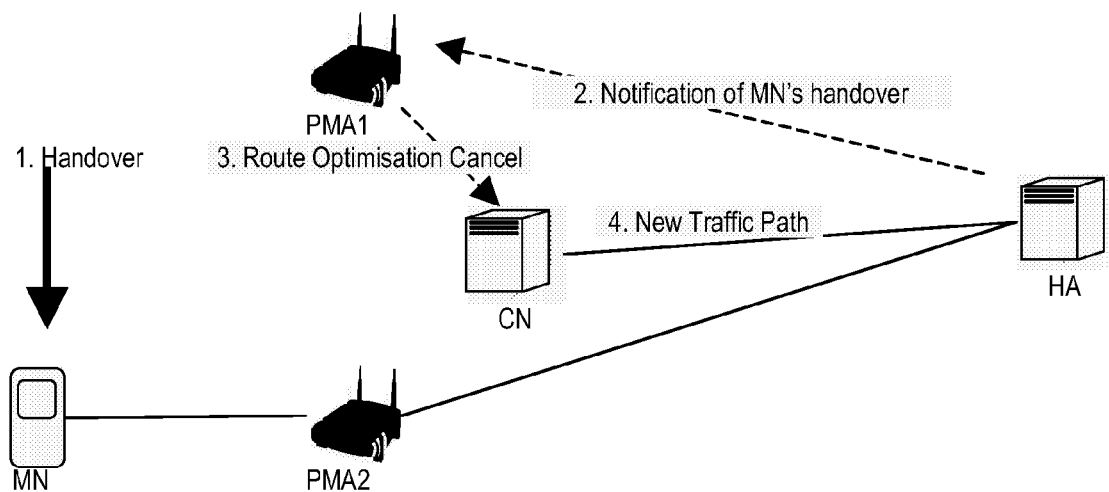
FIG. 16 illustrates schematically the signalling for route optimization after handover in the embodiment illustrated in FIG. 15.

After handover of MN from PMA1 to PMA2, the HA informs PMA1 that MN is now attached to PMA2. In response to this information, PMA1 sends a request to the CN to cancel route optimization. The CN deletes the binding cache entry of MN, and as a result of this deletion sends all packets destined for MN to the HA, as illustrated in FIG. 16.

Figure 17:
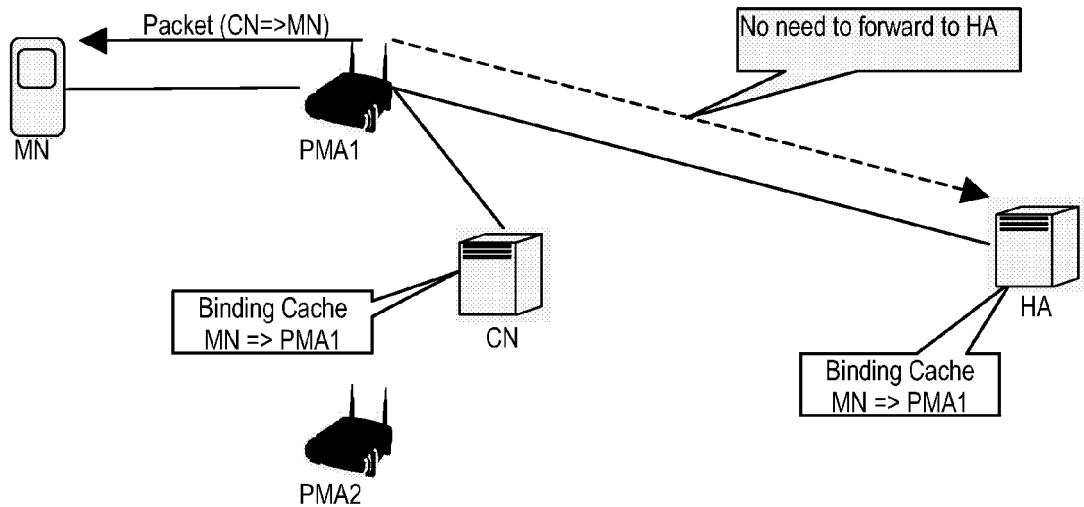
FIG. 17 illustrates schematically traffic flow when a Mobile Node is reachable from a Proxy Mobile Agent.

The bi-casting described above may not be necessary if the PMA can detact that a Mobile Node has become unreachable immediately after the Mobile Node leaves the coverage of the PMA (e.g., the indication from the link-layer protocols). FIG. 17 illustrates the user traffic flow when the MN is reachable. In this case, the PMA1 does not forward the packets destined for the MN to the HA, as bi-casting is unnecessary. Packets sent from the CN and destined for the MN are sent to PMA1 and forwarded directly to the MN.

Figure 18:
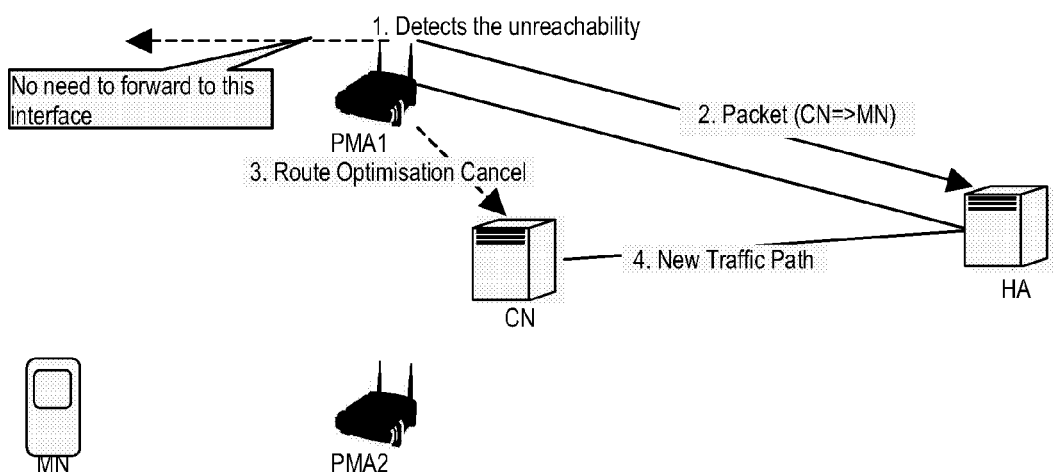
FIG. 18 illustrates schematically the traffic flow after it is determined that the Mobile Node of FIG. 17 is not reachable from the Proxy mobile Agent.

When the MN attaches to a new Proxy Mobile Agent, PMA2, it becomes unreachable from PMA1. PMA1 detects the unreachability of the MN and so stops sending downlink packets directly to the MN. Instead, the PMA1 sends the downlink packets to the HA, which will be forwarded to PMA2 and then to the MN. PMA1 also sends a request to cancel the route optimization to the CN. The CN deletes the binding cache entry of the MN and sends packets destined for the MN to the HA, as illustrated in FIG. 18.

Figure 19:
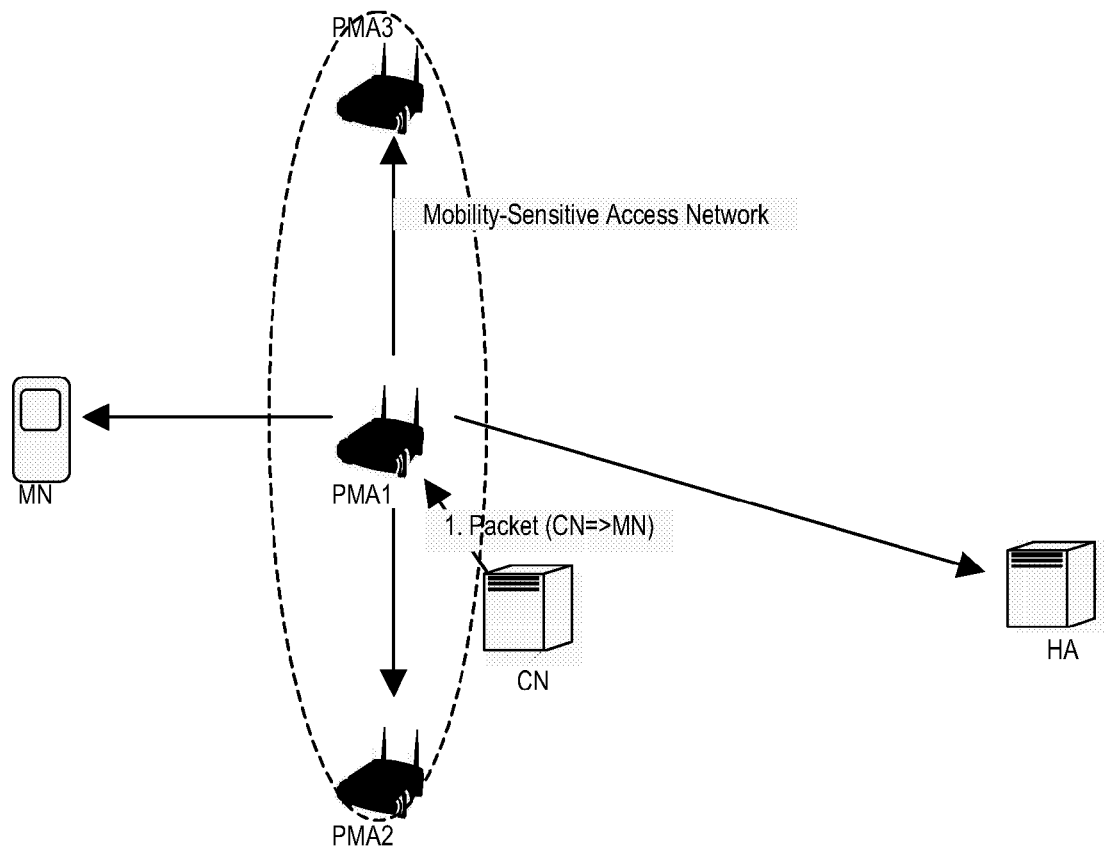
FIG. 19 illustrates schematically movement of a Mobile Node in a mobility-aware access network.

In a mobility-aware access betwork, the access network can keep track of the PMA to which the mobile node is attached, as illustrated in FIG. 19. Packet loss during handover can be reduced. PMA1 sends the downlink packets not only to the MN and the HA but also to other neighbouring PMAs. In FIG. 19, the PMA1 sends the downlink packets destined for the MN to the MN, the HA, PMA2 and PMA3. The tunnels between PMAs are assumed to be set up. PMA2 and PMA3 discard the downlink packets destined for the MN because the MN is not attached to either of these Proxy Mobile Agents.

Figure 20:
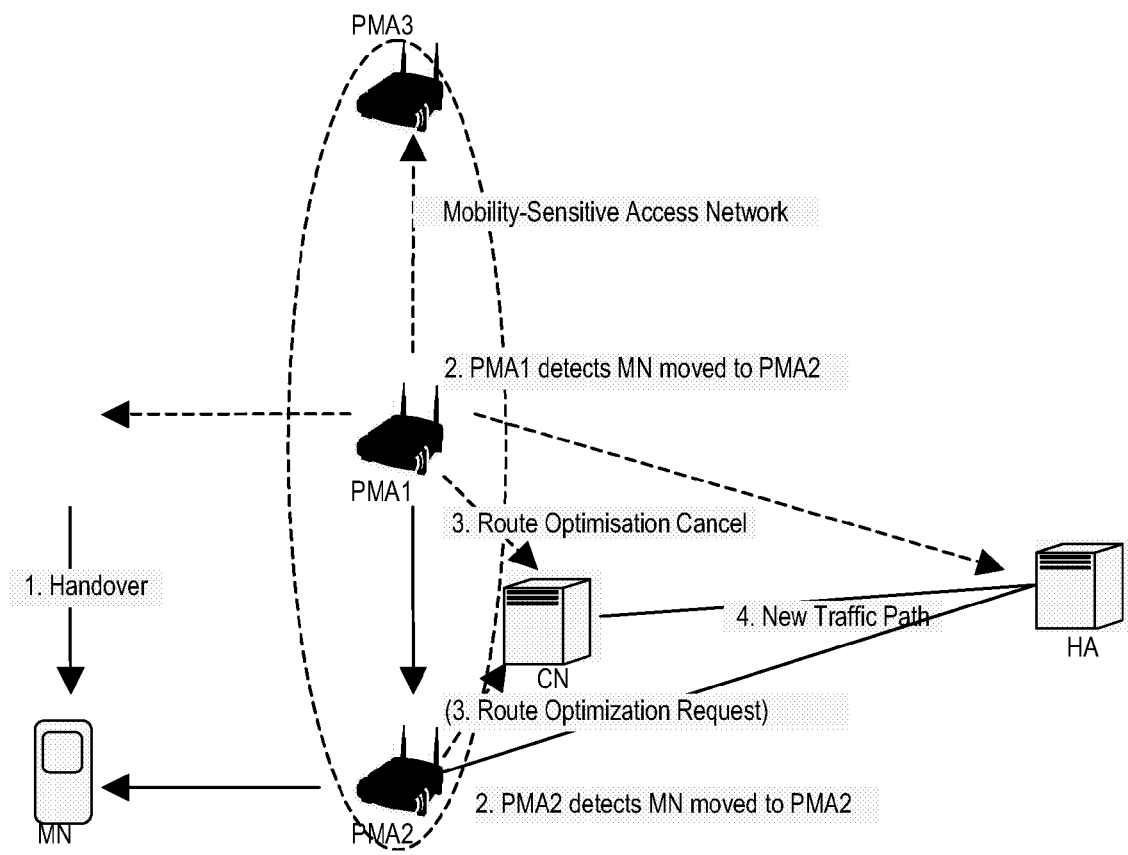
FIG. 20 illustrates schematically the signalling involved after handover of the Mobile Node of FIG. 19 to a new Proxy Mobile Agent.

The case where the MN moves and becomes attached to PMA2 is illustrated in FIG. 20. PMA1 detects that the MN has moved to PMA2 because the access network is aware of mobility. PMA1 then sends downlink packets to PMA2 only, and stops sending downlink packets to the HA and PMA3. PMA1 also sends a request to cancel the route optimization to the CN. On receipt of the request to cancel route optimization, the CN deletes the binding cache entry of MN and sends the packets destined for the MN to the HA, which will in turn forward them to the MN via PMA2.

PMA2 also detects that the MN has moved to PMA2, and so PMA2 starts to send downlink packets to the MN. Because the downlink packets (from the CN) are forwarded from PMA1, the PMA2 is aware that the downlink packets have been sent through the optimized route by the PMA1. This triggers PMA2 to a request for route optimization to the CN.

The embodiments described above that do not rely on bi-casting can be used in addition to the bi-casting embodiment. For example, the bi-casting embodiment can be used as a fall-back solution for cases where the movement of the Mobile Node has, for some reason, not been detected. Compared to the bi-casting embodiment, less traffic is sent between the PMA and the HA, and packet loss during handover can be reduced.

It will be appreciated by the person of skill in the art that various modifications may be made to the above described embodiments without departing from the scope of the present invention.

The invention claimed is:

1. A method of routing communications traffic in a Proxy Mobile IP communications network, wherein a Mobile Node is attached to a first Proxy Mobile Agent and an optimized route is established between the Mobile Node and a Corresponding Node via the first Proxy Mobile Agent, and wherein the Mobile Node subsequently detaches from the first Proxy Mobile Agent and attaches to a second Proxy Mobile Agent, the method comprising the steps of:
- at the first Proxy Mobile Agent, receiving packets sent from the Corresponding Node;
- forwarding the packets to the Mobile Node and to a Home Agent of the Mobile Node;
- in the event that the packets are returned to the first Proxy Mobile Agent from the Home Agent, determining that the Mobile Node is attached to the first Proxy Mobile Agent, and in the event that the packets are not returned to the first Proxy Mobile Agent from the Home Agent, determining that the Mobile Node is no longer attached to the first Proxy Mobile Agent; and,
- as a result of a determination that the Mobile Node is no longer attached to the first Proxy Mobile Agent, sending a request from the first Proxy Mobile Agent to the Corresponding Node to cancel the route optimization.

2. The method according to claim 1, wherein, prior to establishing the optimized route between the Mobile Node and the Corresponding Node, the method further comprises the steps of:
- establishing that the Mobile Node and the Corresponding Node belong to the same Proxy Mobile IP Domain;
- sending a request for route optimization from the first Proxy Mobile Agent to the Corresponding Node via the second Proxy Mobile Agent; and,
- on receiving at the first Proxy Mobile Agent an acknowledgement of the request, creating a Binding Cache entry at the first Proxy Mobile Agent, wherein the Binding Cache entry includes the source address of the second Proxy Mobile Agent.

3. The method according to claim 1, wherein, prior to determining when the Mobile Node is no longer attached to the first Proxy Mobile Agent, forwarding packets destined for the Mobile node to the Mobile Node, a Home Agent, and at least one neighbouring Proxy Mobile Agent.

4. The method according to claim 3, wherein the Mobile Node is connected to the first Proxy Mobile Agent via a mobility-aware access network.

5. The method according to claim 3, further comprising, as a result of the determination that the Mobile Node is no longer attached to the first Proxy Mobile Agent, cancelling the forwarding of packets to the Home Agent.

6. The method according to claim 1, wherein the request to cancel the route optimization is a request to delete at the Corresponding Node a Binding Cache entry for the Mobile Node.

7. A method performed in a Proxy Mobile Agent, comprising the steps of:
- receiving packets sent from a Corresponding Node;
- sending the packets to a Mobile Node and to a Home Agent of the Mobile Node;
- determining that the Mobile Node is attached to the first Proxy Mobile Agent if the sent packets are returned from the Home Agent or that the Mobile Node is no longer attached to the first Proxy Mobile Agent if the sent packets are not returned from the Home Agent; and,
- as a result of determining that the Mobile Node is no longer attached to the first Proxy Mobile Agent, sending a request to a Corresponding Node to cancel a route optimization.

8. The method according to claim 7, further comprising the steps of:
- determining that the Mobile Node and the Corresponding Node belong to the same Proxy Mobile IP Domain;
- sending a request for route optimization from the Proxy Mobile Agent to the Corresponding Node via a further Proxy Mobile Agent;
- receiving an acknowledgement of the request; and,
- creating a Binding Cache entry, the Binding Cache entry including the source address of the further Proxy Mobile Agent.

* * * * *

UNITED STATES PATENT AND TRADEMARK OFFICE
CERTIFICATE OF CORRECTION

| | |
|---|---|
| PATENT NO. | : 8,189,512 B2 |
| APPLICATION NO. | : 12/532808 |
| DATED | : May 29, 2012 |
| INVENTOR(S) | : Kato et al. |

It is certified that error appears in the above-identified patent and that said Letters Patent is hereby corrected as shown below:

On the Title Page, in Field (73), under "Assignee", in Column 1, Line 1, delete "Telefonaktibolaget" and insert -- Telefonaktiebolaget --, therefor.

In Column 1, Line 18, delete "change" and insert -- change. --, therefor.

In Column 1, Line 44, delete "(NM)" and insert -- (NAI) --, therefor.

In Column 6, Line 32, delete "MN" and insert -- MN. --, therefor.

In Column 6, Line 50, delete "commnicate" and insert -- communicate --, therefor.

In Column 6, Line 61, delete "HAL" and insert -- HA1. --, therefor.

In Column 7, Line 6, delete "non-optimaized" and insert -- non-optimized --, therefor.

In Column 7, Line 67, delete "infomring" and insert -- informing --, therefor.

In Column 8, Line 16, delete "detact" and insert -- detect --, therefor.

In Column 8, Line 33, delete "betwork," and insert -- network, --, therefor.

Signed and Sealed this
Eleventh Day of September, 2012

David J. Kappos
*Director of the United States Patent and Trademark Office*